Jan. 28, 1930. A. W. AMSDEN 1,744,856
FEELER GAUGE
Filed May 11, 1927
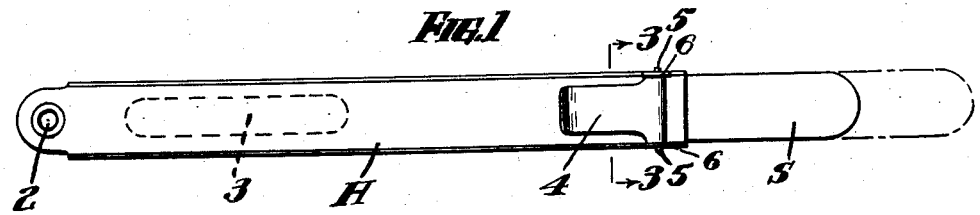
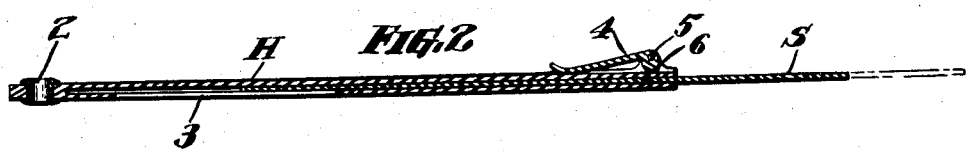
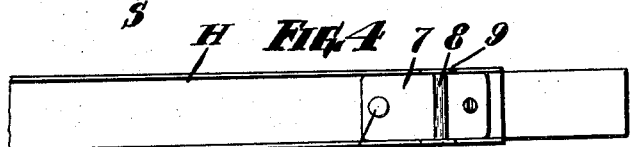
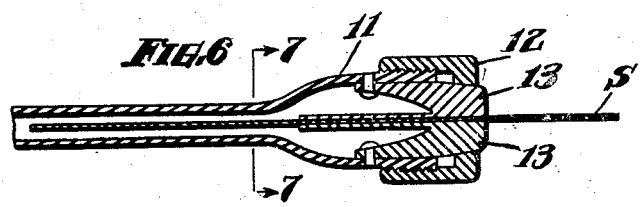
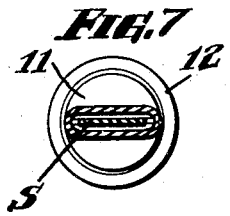
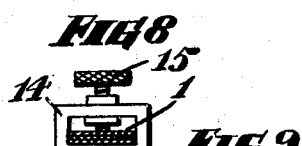
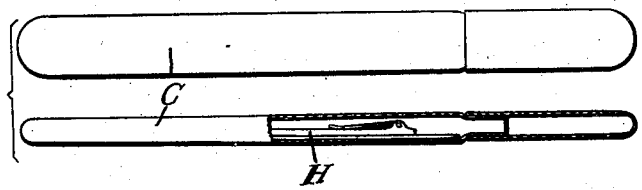
Inventor
Albert W. Amsden
By Ellis Spear Jr.
Attorney Patented Jan. 28, 1930

1,744,856

UNITED STATES PATENT OFFICE

ALBERT W. AMSDEN, OF ATHOL, MASSACHUSETTS, ASSIGNOR TO THE L. S. STARRETT COMPANY, OF ATHOL, MASSACHUSETTS, A CORPORATION OF MASSACHUSETTS

FEELER GAUGE

Application filed May 11, 1927. Serial No. 190,639.

The ordinary thickness or feeler gauge used by machinists and tool makers in gauging narrow slots, and by automobile mechanics in gauging valves, spark gaps, etc., consists of a plurality of gauging leaves of different thicknesses mounted on a common pivot and adapted to fold into and out of an open sided case. This construction provides a complete gauge set which may be conveniently carried in the pocket and from which a gauge leaf of selected thickness within the range of the set may be brought into use instantly.

In certain classes of work, however, and particularly in the automotive field where specifications are practically standard for each particular make of car, the ordinary automobile mechanic does not need the gauge leaves in all of the wide range of thicknesses supplied with a complete feeler gauge set, and consequently uses only the one or two of the leaves in the set which are standard for the car on which he is working, so that when these leaves become distorted or broken, the entire set is rendered useless so far as he is concerned.

This has given rise to the practice among certain automobile manufacturers of buying from the makers of feeler gauge stock strips or lengths of such stock in the particular thickness or thicknesses needed in gauging the particular car of his manufacture. The automobile mechanic working upon such car simply cuts off from such a strip with a pair of tinsmith's shears a short piece of the particular thickness needed and uses this piece of stock until it becomes distorted or broken, whereupon it is discarded and he supplies himself with another piece.

From this practice, there has risen a definite demand for more scientific and economic methods of distribution and use. To meet this demand, therefore, I have devised my present invention. In it, I have deliberately followed existing practice in so far as supplying a relatively long strip of feeler gauge stock to the mechanic is concerned, but I have provided for the encasement of this strip in a holder from which the strip may be withdrawn as far as needed in order to gauge any particular piece of work and may be positively clamped at such or any position of adjustment. By encasing the stock in a holder, I protect the mechanic against cutting his fingers on the edges of the stock, which are sharp and make the stock difficult to handle in the bare hands, and by providing for the selective projection and positive locking of so much or so little of the stock as may be desired, I effect economy in the use of the stock in that the mechanic may not only cut off the exposed end of the stock when it becomes bent or distorted but the stock may be used up practically down to the last half inch, because the holder at all times provides a convenient handle by means of which even the shortest piece of stock left in the holder may be manipulated as a gauge piece. In other words, a mechanic using a holder such as contemplated herein can continue to cut off the stock as it becomes torn or distorted down to practically the last half inch in the holder and by reason of the availability of the holder as a handle, such last half inch of stock can be used for purposes of gauging.

Structurally, my holder takes the form of a combination case and handle member of a length normally to contain all of the strip of gauge stock except about an inch thereof which is exposed through the open end of the case as a feeler gauge. This case or holder is provided with releasable stock clamping means whereby the stock may be positively clamped therein with any desired amount thereof projecting beyond the open end of the case and by releasing the stock clamp more or less of the stock may be withdrawn from the case as may be desired and clamped at the desired position of adjustment. Obviously the stock clamp may take a variety of forms, and in the accompanying drawings I have shown several possible methods any of which may be regarded as characteristic. In the drawings:—

Fig. 1 is a top plan view of a holder for thickness gauge stock in accordance with my invention and illustrating in dotted lines the projection of the thickness gauge stock from the case, as desired.

Fig. 2 is a longitudinal section through the device shown in Fig. 1.

Fig. 3 is a cross section on the line 3—3, of Fig. 1.

Figs. 4 and 5 are, respectively, fragmentary plan and longitudinal sections showing a modification of the releasable stock clamp.

Figs. 6 and 7 are, respectively, a longitudinal and transverse section showing a further modification of such clamp, Fig. 7 being taken on the line 7—7, of Fig. 6.

Fig. 8 is a cross section illustrating a still further modification, and

Fig. 9 is a perspective view showing a pocket size container within which my holder and a plurality of strips of the same or different sizes of thickness gauge stock may be packed for convenience of assembly and use.

My holder consists of a generally rectangular-shaped case closed at one end and open at its opposite end and presenting spaced top and bottom walls and connecting side walls. This holder may be made of any desired material and in the forms shown in Figs. 1 to 5, inclusive, and in Fig. 8, the top wall thereof is preferably made of a material which will be sufficiently flexible to permit it to be deformed, by suitable means, down upon the inserted strip of feeler gauge stock so as releasably to hold said stock in any position of adjustment therein.

I have indicated at H the holder generally and at S the stock. In Figs. 1 to 5, inclusive, and in Fig. 8, the flexible top wall of the holder is designated by the numeral 1. If desired, the holder may be provided with an eyelet 2 at its closed end by means of which it and the inserted length of stock, may be suspended from a hook or nail. Similarly, the bottom wall of the holder may have an elongated slot 3 therein for the purpose of permitting the introduction of a pointed instrument behind the strip of stock to push the strip of stock out of the case should for any reason it become jammed therein.

In the embodiment of my invention shown in Figs. 1 to 3, inclusive, I have illustrated the releasable stock clamping means as consisting of a cam lever 4 which is pivoted at 5 in ears 6 extending upwardly from the opposite side walls of the case. The cam lever is designed to occupy a position over the flexible top wall of the case and its free end is preferably flared upwardly sufficient to permit the mechanic to engage it with his thumb nail and raise the lever. In this form, the raising of the lever from engagement with the top wall of the case releases the grip of said top wall on the strip of feeler stock, permitting the stock to be projected into or out of the case, after which the lever is swung down to again cause the stock to be clamped in its adjusted position.

In Figs. 4 and 5, I have shown a variation of the cam lever of Figs. 1 to 3, inclusive. such variation consists of a wedge 7 slidable beneath a cross bar 8 fixed in bearings 9 rising from the opposite side walls of the case. The wedge 7 is provided with an upstanding projection 10 by means of which the wedge may be slid relative to said cross bar, the movement of the wedge in one direction pressing the top wall of the case into clamping engagement with the inserted strip of stock and in the opposite direction releasing such clamp. In both forms of clamp, the flexible top wall of the case is utilized as the clamp itself and the cam lever or the sliding wedge as the case may be constitutes the element by means of which the top wall is deformed into engagement with the inserted strip of stock.

In Figs. 6 and 7, I depart from this arrangement and instead form the open end of the case as a bearing 11 for an operating sleeve 12 which is threaded thereon as shown and I fix within said bearing interiorly thereof a plurality of spring clamping jaws 13 adapted to be closed upon the inserted strip of gauge stock by means of said chuck.

As a further variation I may provide the holder with a yoke 14 (Fig. 8) upon which is mounted a thumb screw 15 adapted to bear against the flexible top wall of the case to force it into clamping engagement with the inserted strip when the screw is turned in one direction and to release the clamping action when the screw is turned in the other direction.

In all of these embodiments of my invention, however, the arrangement is such as to permit the stock to be projected at will from the holder and to be clamped in any desired position of adjustment. I have indicated in full lines in Figs. 1 and 2, the strip of feeler gauge stock projected from the holder sufficiently to permit its use as a gauge, and I have shown in dotted lines the stock projected still farther from the holder as may be required under certain conditions of use, it being understood that when the exposed end of the stock becomes battered or distorted in use the mechanic simply cuts off, with a pair of tinsmith's shears, so much of the stock as has become unsuitable for use. This operation may be repeated from time to time until practically all of the stock has been used up, and in fact, because of the function of the holder as a manipulating handle as well as a case, the stock may be used down to practically the last half inch.

In Fig. 9 I have shown at C a pocket size case or box in which the holder and with it a plurality of strips of stock of the same or different thicknesses may be packed. This box is of the ordinary removable lid type and forms a convenient pack for the holder and strips in shipment as well as a handy pocket size container for the use of the mechanic in the shop.

Various modifications in the form and construction of my device may obviously be resorted to, all without departing from the spirit of my invention if within the limits of the appended claims.

What I therefore claim and desire to secure by Letters Patent is:—

1. The combination in a feeler gauge of a hollow member constituting a combination manipulating handle and hand protective casing within which a sharp-edged strip of feeler gauge stock is adapted to be inserted endwise a substantial distance with its sharp edges protected by the casing and with one end exposed beyond the adjacent end of the casing for use as a flexible feeler gauge portion which is adapted to be cut off when mutilated but which before being cut off constitutes a finger grasping portion by means of which the strip may be grasped and progressively withdrawn from the casing a distance sufficient to present an unmutilated length of strip as a newly exposed gauging end, and a releasable strip clamp mounted on said casing and permissive of the longitudinal projection of the strip from the casing and of the frictional clamping thereof at any selected position or projection.

2. The combination in a feeder gauge, of a hollow member constituting a combination manipulating handle and hand protective casing within which a sharp-edged strip of feeler gauge stock is adapted to be inserted endwise a substantial distance with its sharp edges protected by the casing and with one end exposed beyond the adjacent end of the casing for use as a flexible feeler gauge portion which is adapted to be cut off when mutilated but which before being cut off constitutes a finger grasping portion by means of which the strip may be grasped and progressively withdrawn from the casing a distance sufficient to present an unmutilated length of strip as a newly-exposed gauging end, said casing comprising a walled enclosure including spaced top and bottom walls defining a strip receiving chamber closed at one end and open at its opposite end, and a releasable strip clamp mounted on said casing and permissive of the longitudinal projection of the strip from the casing and of the frictional clamping thereof at any selected position of projection.

3. The combination in a feeler gauge of a hollow member constituting a combination manipulating handle and hand protective casing within which a sharp-edged strip of feeler gauge stock is adapted to be inserted endwise a substantial distance with its sharp edges protected by the casing and with one end exposed beyond the adjacent end of the casing for use as a flexible feeler gauge portion which is adapted to be cut off when mutilated but which before being cut off constitutes a finger grasping portion by means of which the strip may be grasped and progressively withdrawn from the casing a distance sufficient to present an unmutilated length of strip as a newly-exposed gauging end, said casing comprising a walled enclosure including spaced top and bottom walls defining a strip receiving chamber closed at one end and open at its opposite end, one wall of said enclosure being resiliently deformable to engage and hold the strip within the casing, and a strip clamp mounted on said casing adjacent said deformable wall thereof for forcing said wall into clamping engagement with the strip to hold the adjustment thereof and releasable to permit projection of the strip from the casing.

4. A holder for a strip of sharp edged feeler gauge stock adapted successively to be cut off at its exposed end when mutilated, comprising a combination handle member and protective casing consisting of a walled enclosure including spaced top and bottom walls defining a stock receiving chamber closed at one end and open at its opposite end within which the strip of stock is endwise insertible to the full depth of said chamber with its sharp edges protected by the casing and with one end of said strip exposed beyond the open end of said chamber as a flexible feeler gauge portion which is adapted to be cut off when mutilated but which before being cut off constitutes a finger-grasping portion by means of which the strip may be grasped and progressively withdrawn from the casing a distance sufficient to present an unmutilated length of strip as a newly exposed gauging end, one wall of said enclosure being resiliently deformable to engage and hold the stock within said casing, and a releasable clamp on said casing adjacent said deformable wall for forcing said wall into clamping engagement with the strip of stock to hold the adjustment thereof.

5. A holder for a strip of sharp edged feeler gauge stock, adapted successively to be cut off at its exposed end when mutilated, comprising a combination handle member and protective casing consisting of a walled enclosure including spaced top and bottom walls defining a stock receiving chamber closed at one end, and open at its opposite end and within which the strip of stock is endwise insertible to the full depth of said chamber with its sharp edges protected by the casing and with one end of said strip exposed beyond the open end of said chamber as a flexible feeler gauge portion which is adapted to be cut off when mutilated but which before being cut off constitutes a finger-grasping portion by means of which the strip may be grasped and progressively withdrawn from the casing a distance sufficient to present an unmutilated length of strip as a newly exposed gauging end, one wall of said enclosure being resiliently deformable to engage and hold the stock within said casing, and a cam lever pivoted to said casing for forcing said deformable wall into clamping engagement with the strip of stock to hold the adjustment thereof.

In testimony whereof I affix my signature.

ALBERT W. AMSDEN.